(12) United States Patent
Shin et al.

(10) Patent No.: US 7,491,470 B2
(45) Date of Patent: Feb. 17, 2009

(54) ELECTROLYTE FOR LITHIUM BATTERY AND LITHIUM BATTERY COMPRISING SAME

(75) Inventors: Dae-Yup Shin, Suwon-si (KR); Dong-Hyun Jung, Suwon-si (KR); Soo-Jin Park, Suwon-si (KR); Kyoung-Han Yew, Suwon-si (KR); Hyun-Jeong Lim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 452 days.

(21) Appl. No.: 11/259,945

(22) Filed: Oct. 26, 2005

(65) Prior Publication Data

US 2006/0099514 A1    May 11, 2006

(30) Foreign Application Priority Data

Oct. 28, 2004   (KR) .................... 10-2004-0086596

(51) Int. Cl.
*H01M 10/40* (2006.01)

(52) U.S. Cl. .................. 429/326; 429/200; 429/231.95; 429/332

(58) Field of Classification Search .................. None
See application file for complete search history.

(56) References Cited

U.S. PATENT DOCUMENTS

| | | | | |
|---|---|---|---|---|
| 4,888,255 A | * | 12/1989 | Yoshimitsu et al. | ......... 429/101 |
| 5,709,968 A | | 1/1998 | Shimizu | |
| 5,879,834 A | | 3/1999 | Mao | |
| 2006/0105246 A1 | * | 5/2006 | Shin et al. | ................... 429/326 |

FOREIGN PATENT DOCUMENTS

KR   10-0325868   9/2001

OTHER PUBLICATIONS

Patent Abstracts of Korea for Publication No. 1020010086991; Date of publication of application Sep. 15, 2001, in the name of Se Jong Han et al.

* cited by examiner

*Primary Examiner*—John S Maples
(74) *Attorney, Agent, or Firm*—Christie, Parker & Hale, LLP

(57) ABSTRACT

The electrolyte for a lithium battery includes a non-aqueous organic solvent, a lithium salt, and an additive of the following Formula 1:

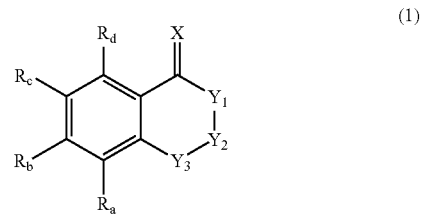

(1)

wherein, X is O or S, $Y_1$, $Y_2$, and $Y_3$ are the same or different from each other and selected from the group consisting of O, S, $CR_2$, and NR, where here R is H, a halogen, or an alkyl having a carbon number of less than or equal to 8, or neighboring alkyl groups are combined to each other to form a cycle or hetero cycle, and $R_a$ to $R_d$ are the same or different from each other and selected from H, a halogen, an alkoxy group having a carbon number of less than or equal to 8, or an unsaturated or saturated alkyl group having a carbon number of less than or equal to 8, or neighboring alkyl groups are combined to each other to form a cycle or hetero cycle.

21 Claims, 1 Drawing Sheet

ELECTROLYTE FOR LITHIUM BATTERY AND LITHIUM BATTERY COMPRISING SAME

CROSS REFERENCE TO RELATED APPLICATION

This application claims priority to and the benefit of Korean patent application No. 10-2004-0086596 filed in the Korean Intellectual Property Office on Oct. 28, 2004, the entire disclosure of which is incorporated herein by reference.

FIELD OF THE INVENTION

The present invention relates to an electrolyte for a lithium battery, and a lithium battery comprising the same, and more particularly, to an electrolyte for a lithium battery which inhibits overcharging of the battery, and a lithium battery comprising the same.

BACKGROUND OF THE INVENTION

The use of portable electronic instruments is increasing as electronic equipment gets smaller and lighter due to developments in high-tech electronic industries.

Studies on lithium secondary batteries are actively being pursued in accordance with the increased need for a battery having high energy density for use as a power source in these portable electronic instruments. Such a lithium secondary battery, having an average discharge potential of 3.7V (i.e., a battery having substantially a 4V average discharge potential) is considered to be an essential element in the digital generation since it is an indispensable energy source for portable digital devices such as cellular telephones, notebook computers, camcorders, etc. (i.e., the "3C" devices).

Also, there has been extensive research on batteries with effective safety characteristics such as preventing overcharging.

When a battery is overcharged, an excess of lithium ions is deposited on a positive electrode, and an excess of lithium ions is also inserted into a negative electrode, making the positive and negative electrodes thermally unstable. An eruptive explosion occurs from a decomposition of the electrolytic organic solvent, and the thermal runaway that occurs causes serious problems of battery safety.

To overcome the above problems, it has been suggested that an aromatic compound such as an oxidation-reduction additive agent ("redox shuttle") be added to the electrolyte. For example, U.S. Pat. No. 5,709,968 discloses a non-aqueous lithium ion secondary battery to prevent thermal runaway resulting from an overcharge current by using a benzene compound such as 2,4-difluoroanisole. U.S. Pat. No. 5,879,834 discloses a method for improving battery safety by using a small amount of an aromatic compound, such as biphenyl, 3-chlorothiophene, furan, etc., which is electrochemically polymerized to increase the internal resistance of a battery during unusual overvoltage conditions. Such redox shuttle additives increase the temperature inside the battery early due to heat produced by the oxidation-reduction reaction, and close pores of a separator through quick and uniform fusion of the separator to inhibit an overcharge reaction. The polymerization reaction of these redox shuttle additives consumes the overcharge current to improve battery safety.

However, the need for high capacity batteries is increasing, and these redox shuttle additives cannot provide the high level of safety required of such high capacity batteries. Therefore, a need exists for an electrolyte capable of preventing overcharge and ensuring battery safety.

SUMMARY OF THE INVENTION

An exemplary embodiment of the present invention provides an electrolyte for a lithium battery capable of improving battery safety.

Another embodiment of the present invention provides a lithium battery which includes the above electrolyte.

According to one embodiment of the present invention, an electrolyte for a lithium battery includes a non-aqueous organic solvent, a lithium salt, and an additive. The additive is represented by the following Formula 1:

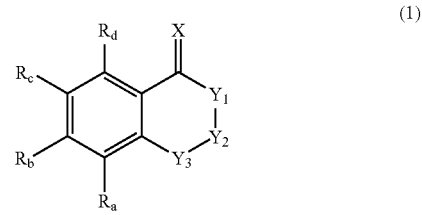

(1)

wherein, X is O or S, $Y_1, Y_2$, and $Y_3$ are the same or different from each other and selected from the group consisting of O, S, $CR_2$, and NR, where here R is H, a halogen, or an alkyl having a carbon number of less than or equal to 8, and where adjacent R groups may optionally be combined to each other to form cycles or hetero cycles, and $R_a$ to $R_d$ are the same or different from each other and selected from H, a halogen, an alkoxy group having a carbon number of less than or equal to 8, or an unsaturated saturated alkyl group having a carbon number of less than or equal to 8, and where adjacent $R_a$ to $R_d$ groups may optionally be combined to each other to form cycles or hetero cycles.

According to another embodiment of the present invention, a lithium battery is provided that includes the above electrolyte, a positive electrode including a positive active material being capable of intercalating and deintercalating lithium ions, and a negative electrode including an active material selected from the group consisting of a material being capable of intercalating/deintercalating lithium ions, a lithium metal, a lithium-containing alloy, and a material being capable of forming a lithium-containing compound by reversibly reacting lithium.

BRIEF DESCRIPTION OF THE DRAWING

The accompanying drawing, which is incorporated in and constitutes a part of the specification, illustrates embodiments of the invention, and together with the description, serves to explain the principles of the invention.

DETAILED DESCRIPTION OF THE INVENTION

Figure 1:
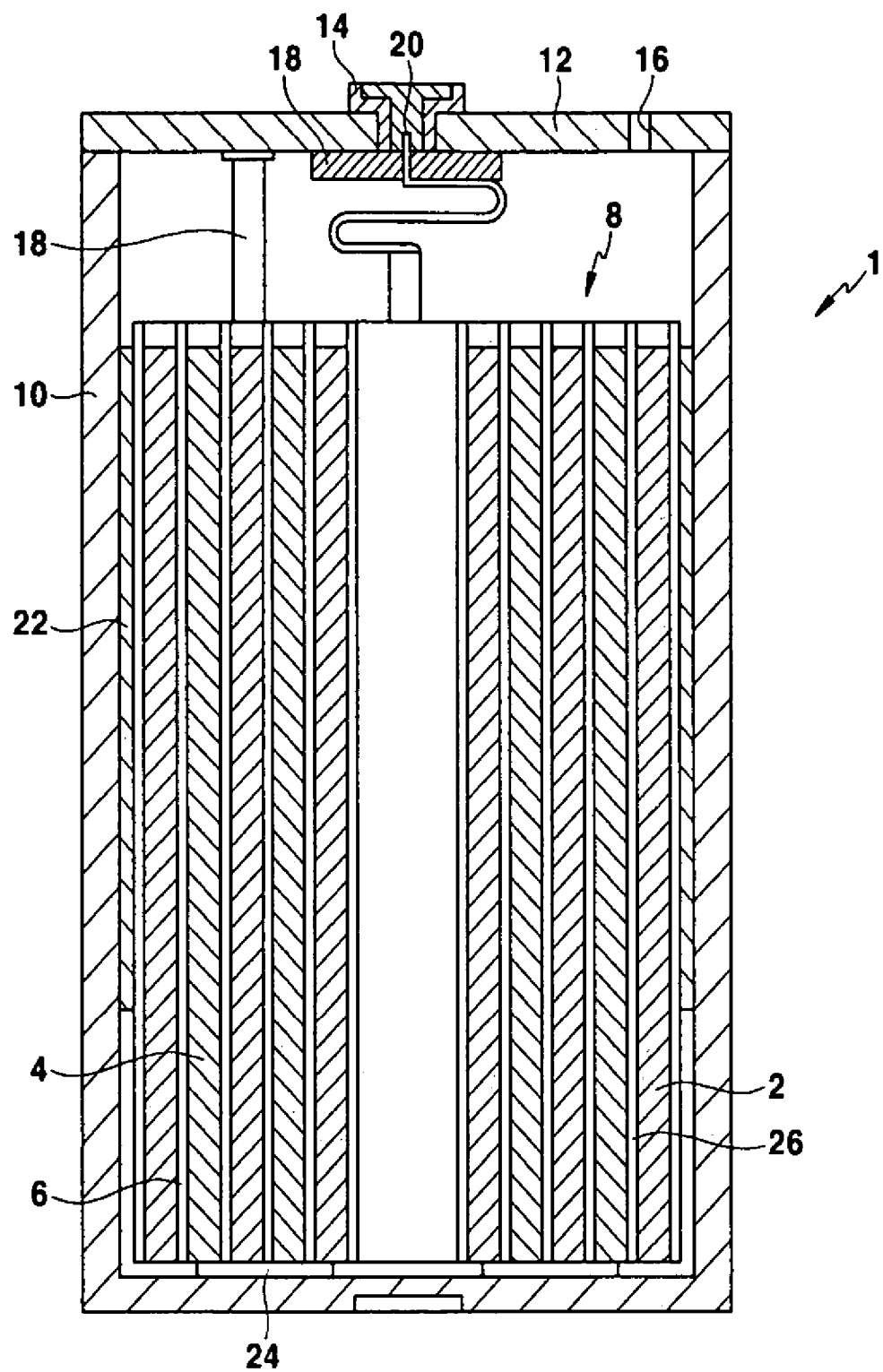
FIG. 1 is a cross-sectional view of a non-aqueous lithium battery cell.

In the following detailed description, embodiments of the invention have been shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

A cross-sectional view of a general non-aqueous Li-ion cell is shown in FIG. 1.

The Li-ion cell 1 is fabricated by inserting an electrode assembly 8, including a positive electrode 2, a negative electrode 4, and a separator 6 interposed between the positive and negative electrodes 2 and 4 into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached on the positive electrode 2 and the negative electrode 4. Insulators 22 and 24 are installed on the side and lower parts of the electrode assembly 8 to prevent a short circuit occurrence in the battery.

In a lithium battery, the temperature of the battery increases abruptly because of overcharging due to incorrect operation or break-down of the battery, or a short circuit occurrence due to a defect in the battery design, so that thermal runaway takes place. During overcharging, an excessive amount of lithium ions are released from the positive electrode and deposited on the surface of the negative electrode to render the positive and negative electrodes unstable. As a result, exothermic reactions such as pyrolysis of an electrolyte, reactions between the electrolyte and lithium, an oxidation reaction of the electrolyte on the positive electrode, a reaction between the electrolyte and oxygen gas that is generated from the pyrolysis of the positive active material, etc., rapidly increase the temperature inside the battery to cause thermal runaway, and thus, the generation of fire and smoke.

In order to address the above problems, in the present invention a compound represented by the following Formula 1 is used as an electrolyte additive to improve battery safety on overcharging:

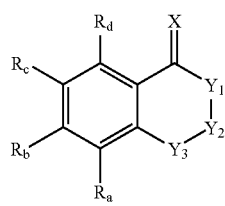

(1)

wherein, X is O or S, $Y_1$, $Y_2$, and $Y_3$ are the same or different from each other and selected from the group consisting of O S, $CR_2$, and NR, where here R is H, a halogen, an alkyl having a carbon number of less than or equal to 8, and where adjacent R groups may optionally be combined to each other to form cycles or hetero cycles, and $R_a$ to $R_d$ are the same or different from each other and selected from H, a halogen, an alkoxy group having a carbon number of less than or equal to 8, or an unsaturated or saturated alkyl group having a carbon number of less than or equal to 8, and where adjacent $R_a$ to $R_d$ groups may optionally be combined to each other to form cycles or hetero cycles.

According to one embodiment, at least one of $R_a$ to $R_d$ is a halogen, an unsaturated or saturated $C_1$ to $C_8$ alkyl group, or a $C_1$ to $C_8$ alkoxy group.

One preferred example of the additive compound is represented by the following Formula 2:

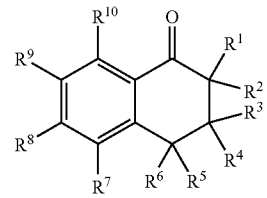

(2)

wherein, $R^1$ and $R^2$ are the same as R in the definition of $Y_1$, $R^3$ and $R^4$ are the same as R in the definition of $Y_2$, $R^5$ and $R^6$ are the same as R in the definition of $Y_3$, and $R^7$ to $R^{10}$ are the same as $R_a$ to $R_d$ in the above Formula 1. That is to say, $R^7$ to $R^{10}$ are the same or different from each other and selected from H, a halogen, an alkoxy group having a carbon number of less than or equal to 8, or an unsaturated or saturated alkyl group having a carbon number of less than or equal to 8, or neighboring alkyl groups are combined to each other to form a cycle or hetero cycle.

Another preferred example of the additive compound is a compound represented by the following Formula 3, where, in the above Formula 1, X is O, and $Y_1$, $Y_2$ and $Y_3$ are $CH_2$:

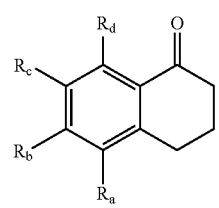

(3)

wherein, $R_a$ to $R_d$ are the same or different from each other and selected from H, a halogen, an alkoxy group having a carbon number of less than or equal to 8, or an unsaturated or saturated alkyl group having a carbon number of less than or equal to 8, or neighboring alkyl groups are combined to each other to form a cycle or hetero cycle, and at least one of $R_a$ to $R_d$ is a halogen.

Another exemplary compound is represented by the Formula 4:

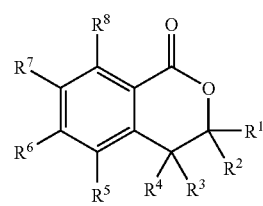

(4)

wherein, $R^1$ and $R^2$ are the same as R in the definition of $Y_2$, $R^3$ and $R^4$ are the same as R in the definition of $Y_3$, and $R^5$ to $R^8$ are the same as $R_a$ to $R_d$ in the above Formula 1. That is to say, $R^5$ to $R^8$ are the same or different from each other and selected from H, a halogen, an alkoxy group having a carbon number of less than or equal to 8, or an unsaturated or saturated alkyl group having a carbon number of less than or equal to 8, or neighboring alkyl groups are combined to each other to form a cycle or hetero cycle. At least one of $R^5$ to $R^8$ is a halogen.

Another exemplary compound is represented by the Formula 5:

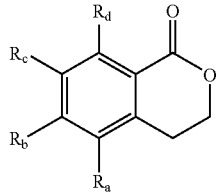

(5)

wherein, $R_a$ to $R_d$ are the same or different from each other and selected from H, a halogen, and preferably from fluorine, an alkoxy group having a carbon number of less than or equal to 8, or an unsaturated or saturated alkyl group having a carbon number of less than or equal to 8, and at least one of $R_a$ to $R_d$ is a halogen.

Another exemplary compound is represented by the Formula 6:

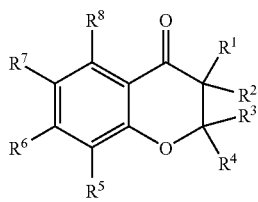

(6)

wherein, $R^1$ and $R^2$ are the same as R in the definition of $Y_1$, $R^3$ and $R^4$ are the same as R in the definition of $Y_2$, and $R^5$ to $R^8$ are the same as $R_a$ to $R_d$ in the above Formula 1. That is to say, $R^5$ to $R^8$ are the same or different from each other and selected from H, a halogen, an alkoxy group having a carbon number of less than or equal to 8, or an unsaturated or saturated alkyl group having a carbon number of less than or equal to 8, or neighboring alkyl groups are combined to each other to form a cycle or hetero cycle. At least one of $R^5$ to $R^8$ is a halogen.

Another exemplary compound is represented by the Formula 7:

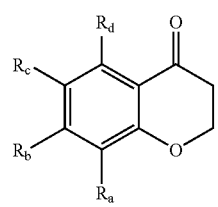

(7)

wherein, $R_a$ to $R_d$ are the same or different from each other and selected from H, a halogen, and preferably from fluorine, an alkoxy group having a carbon number of less than or equal to 8, or an unsaturated or saturated alkyl group having a carbon number of less than or equal to 8. At least one of $R^5$ to $R^8$ is a halogen, preferably one from fluorine, an alkoxy group having a carbon number of less than or equal to 8, or an unsaturated or saturated alkyl group having a carbon number of less than or equal to 8.

The compound of the above Formula 1 includes a compound represented by the following Formulas 8 to 29:

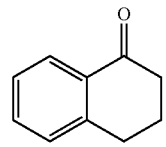

(8)

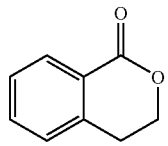

(9)

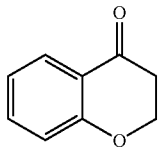

(10)

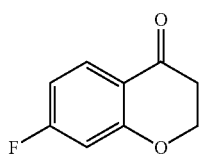

(11)

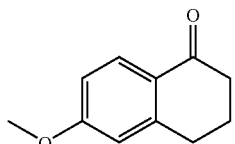

(12)

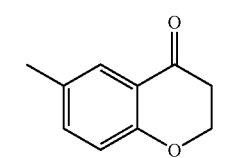

(13)

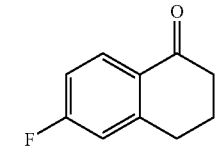

(14)

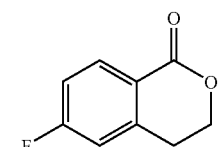

(15)

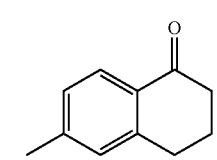

(16)

-continued

(17) 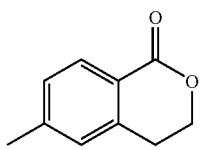

(18) 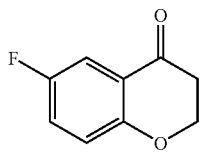

(19) 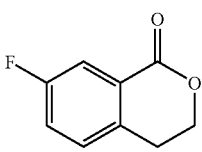

(20) 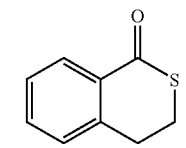

(21) 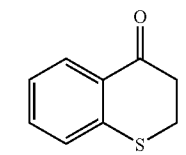

(22) 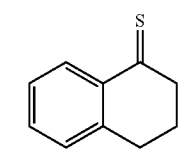

(23) 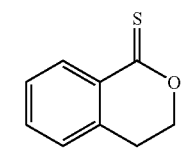

(24) 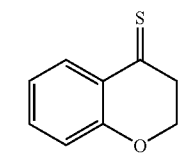

(25) 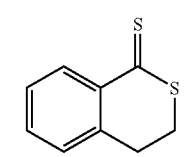

(26) 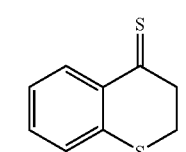

-continued

(27) 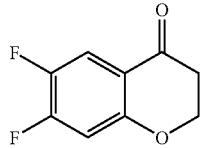

(28) 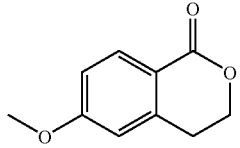

(29) 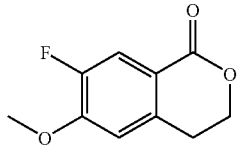

The additive compound represented by the above Formula 1 initiates. polymerization at more than about 4.5V to coat an electrode surface and increase resistance between positive and negative electrodes. Alternatively, the compound performs an oxidation/reduction reaction at a voltage of more than about 4.5V to consume an applied current at overcharge and ensure safety of a lithium battery.

The additive compound of the above Formula 1 may be used in an amount of 0.01 to 50 wt %, preferably 0.01 to 30 wt %, more preferably 0.01 to 10 wt %, and still more preferably 0.01 to 5 wt % based on the total weight of the electrolyte. When the amount of the compound is less than 0.1 wt %, the electrolyte may be ignited. When it is more than 50 wt %, a battery performance may be deteriorated.

The additive compound is added to a non-aqueous organic solvent including a lithium salt. The lithium salt acts as a supply source of lithium ions in the battery, making the basic operation of a lithium battery possible. The non-aqueous organic solvent plays a role of a medium wherein ions capable of participating in the electrochemical reaction are mobilized.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein x and y are natural numbers), LiCl, LiI, and a mixture thereof.

The concentration of the lithium salt preferably ranges from 0.6 to 2.0M, more preferably 0.7 to 1.6M. When the concentration of the lithium salt is less than 0.6M, the electrolyte performance deteriorates due to its ionic conductivity and when the concentration of the lithium salt is greater than 2.0M, the lithium ion mobility decreases due to an increase of the electrolyte viscosity.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include n-methyl acetate, n-ethyl acetate, n-propyl acetate, etc.

It is preferable to use a mixture of a chain carbonate and a cyclic carbonate. The cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, electrolyte performance may be enhanced.

In addition, the electrolyte of the present invention may further include mixtures of the carbonate solvents and aromatic hydrocarbon organic solvents. For the aromatic hydrocarbon organic solvent, a solvent represented by the following Formula 30 may be used. Examples of aromatic hydrocarbon solvents include benzene, fluorobenzene, toluene, trifluorotoluene, chlorobenzene, and xylene.

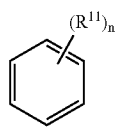

(30)

wherein, $R^{11}$ is a halogen or a $C_1$ to $C_{10}$ alkyl, and n is an integer of 0 to 6.

The carbonate solvents and the aromatic hydrocarbon solvents are preferably mixed together in a volume ratio of 1:1 to 30:1. When a carbonate solvent and an aromatic hydrocarbon solvent are mixed with each other in the aforementioned volume ratio, and the mixture is used as an electrolyte, electrolyte performance may be enhanced.

The present invention provides a lithium battery including the above electrolyte. For a positive active material, a compound being capable of intercalating/deintercalating lithium (a lithiated intercalation compound) reversibly is used. For the negative active material, a carbonaceous material being capable of intercalating/deintercalating lithium, a lithium metal, a lithium-containing alloy, and a carbonaceous material being capable of reversibly forming a lithium-containing compound by reacting lithium is used.

A lithium battery is prepared by the following process. A negative electrode and a positive electrode are fabricated by a conventional process, and an insulating resin with a network structure is interposed between the negative and positive electrodes. Then the whole is wound or stacked to fabricate an electrode assembly and the electrode assembly is inserted into a battery case, followed by sealing. The separator is a polyethylene or polypropylene monolayered separator, a polyethylene/polypropylene double layered separator, a polyethylene/polypropylene/polyethylene three layered separator, or a polypropylene/polyethylene/polypropylene three layered separator. A cross-sectional structure of the lithium battery prepared by the above process is shown in FIG. 1.

The lithium battery includes a non-rechargeable lithium battery or a rechargeable lithium battery.

The lithium battery including the electrolyte of the present invention has improved overcharge inhibiting properties over a battery including a conventional non-aqueous electrolyte.

The following examples further illustrate the present invention in detail, but are not to be construed to limit the scope thereof.

COMPARATIVE EXAMPLE 1

94 g of $LiCoO_2$ as a positive active material, 3 g of Super P (acetylene black) as a conductive agent, and 3 g of polyvinylidenefluoride (PVdF) as a binder were mixed in N-methyl-2-pyrrolidone (NMP) to prepare a positive slurry. The slurry was coated on an aluminum foil having a width of 4.9 cm and a thickness of 147 μm, dried, compressed, and then cut into a predetermined size, thus manufacturing a positive electrode.

90 g of mesocarbon fiber (MCF from PETOCA Company) as a negative active material and 10 g of PVdF as a binder were mixed to prepare a negative slurry. The slurry was coated on a copper foil having a width of 5.1 cm and a thickness of 178 μm, dried, and compressed, and then cut into a predetermined size, thus manufacturing a negative electrode.

Between the manufactured positive and negative electrodes, a polyethylene film separator was interposed followed by winding the whole to fabricate an electrode assembly. The manufactured electrode assembly was placed into a battery case and the electrolyte prepared as above was injected into the case under reduced pressure, thus completing the fabrication of the prismatic rechargeable lithium battery cell.

For an electrolyte, 1.3M $LiPF_6$ dissolved in a mixed solvent of ethylene carbonate, ethylmethyl carbonate, dimethyl carbonate, and fluorobenzene in a volume ratio of 30:55:5:10 was used.

EXAMPLE 1

A prismatic rechargeable lithium battery was prepared according to the same method as in Comparative Example 1 except that 0.25 g of isochroman-1-one having above Formula 9 for the additive was added to 5 g of a solution including 1.3M $LiPF_6$ dissolved in a mixed solvent of ethylene carbonate, ethylmethyl carbonate, propylene carbonate and fluorobenzene in a volume ratio of 30:55:5:10 to prepare an electrolyte, and 2.3 g of the electrolyte was added to the battery case.

EXAMPLE 2

A prismatic rechargeable lithium battery was prepared according to the same method as in Example 1 except that the compound having above Formula 8 was used as an additive.

EXAMPLE 3

A prismatic rechargeable lithium battery was prepared according to the same method as in Example 1 except that the compound having above Formula 10 was used as an additive.

EXAMPLE 4

A prismatic rechargeable lithium battery was prepared according to the same method as in Example 1 except that the compound having above Formula 11 was used as an additive.

EXAMPLE 5

A prismatic rechargeable lithium battery was prepared according to the same method as in Example 1 except that the compound having above Formula 12 was used as an additive.

EXAMPLE 6

A prismatic rechargeable lithium battery was prepared according to the same method as in Example 1 except that the compound having above Formula 13 was used as an additive.

Lithium battery cells of Examples 1 to 6 and Comparative Example 1 were overcharged at 2 C to evaluate safety of the battery cells. Overcharge was performed by applying 2 A of charge current to a fully discharged cell for 2.5 hours. Measurement results of safety of the cells according to Examples 1 to 6 and Comparative Example 1 are shown in Table 1.

TABLE 1

| | Safety |
|---|---|
| Comparative Example 1 | Ignition |
| Example 2 | No ignition |
| Example 1 | No ignition |
| Example 3 | No ignition |
| Example 4 | No ignition |
| Example 5 | No ignition |
| Example 6 | No ignition |

As shown in Table 1, the battery cells according to Examples 1 to 6 have superb safety characteristics compared with the cell according to Comparative Example 1.

The oxidation and reduction potentials of the electrolytes according to Examples 1 to 5 were measured using a cyclic voltametry. The conditions for. measurement were as follows: working electrode: platinum; reference electrode: Li-metal; counter electrode: platinum; voltage range: OCV to 6V; scan rate: 10 mV/s The results are represented in the following Table 2.

TABLE 2

| | Oxidation Potential (V) | Reduction Potential (V) |
|---|---|---|
| Example 2 | 4.86 | 1.30 |
| Example 1 | 5.18 | — |
| Example 3 | 4.50 | 1.30 |
| Example 4 | 4.40 | — |
| Example 5 | 4.70 | 2.30 |

As shown in Table 2, the electrolytes of Examples 1 to 5 showed high oxidation reduction potentials indicating that they are suitable for a high-capacity battery.

The high rate charge characteristics of the cells according to Example 1 were measured. The high rate charge characteristics were as follows: 2 C discharge capacity was represented as a percentage when 1C discharge capacity is 100%. As a result, Example 1 showed 69% of the good rate characteristics.

A lithium battery including an electrolyte of the present invention shows improved overcharge characteristics over the battery including a conventional non-aqueous electrolyte.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a lithium battery, comprising:
a non-aqueous organic solvent;
a lithium salt; and
an additive having the following Formula 1

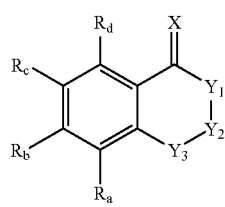

(1)

wherein, X is O or S,
each of $Y_1$, $Y_2$, and $Y_3$ is independently selected from the group consisting of O, S, $CR_2$, and NR, where each R is independently selected from the group consisting of H, halogens, and alkyl groups having a carbon number of less than or equal to 8, and where adjacent R groups may optionally be combined with each other to form cycles or hetero cycles, and each of $R_a$ to $R_d$ is independently selected from the group consisting of H, halogens, alkoxy groups having a carbon number of less than or equal to 8, and unsaturated or saturated alkyl groups having a carbon number of less than or equal to 8, and where adjacent $R_a$ to $R_d$ groups may optionally be combined with each other to form cycles or hetero cycles.

2. The electrolyte of claim 1, wherein each R is independently selected from the group consisting of H, halogens, and $C_1$-$C_8$ alkyl groups, and at least one of $R_a$ to $R_d$ is selected from the group consisting of halogens, unsaturated or saturated $C_1$ to $C^8$ alkyl groups, and $C_1$ to $C_8$ alkoxy groups.

3. The electrolyte of claim 1, wherein at least one of $R_a$ to $R^d$ or R is fluorine.

4. The electrolyte of claim 1, wherein the additive is represented by the following Formula 2:

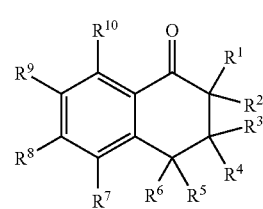

(2)

wherein each of $R^1$ to $R^6$ is independently selected from the group consisting of H, halogens, alkyl groups having a carbon number of less than or equal to 8, and where adjacent $R^1$ to $R^6$ groups may optionally be combined to each other to form cycles or hetero cycles, and each of $R^7$ to $R^{10}$ is independently selected from the group consisting of H, halogens, alkoxy groups having a carbon number of less than or equal to 8, and unsaturated or saturated alkyl groups having a carbon number of less than or equal to 8, and where adjacent $R_7$ to $R_{10}$ groups may optionally be combined with each other to form cycles or hetero cycles.

5. The electrolyte of claim 1, wherein the additive is represented by the following Formula 3:

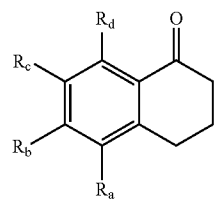

(3)

wherein each of $R_a$ to $R_d$ is independently selected from the group consisting of H, halogens, and alkyl groups having a carbon number of less than or equal to 8, and where adjacent $R_a$ to $R_d$ groups may optionally be combined to each other to form cycles or hetero cycles.

6. The electrolyte of claim 1, wherein the additive is represented by the following Formula 4:

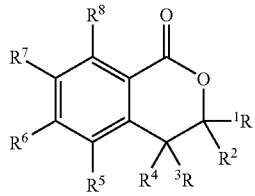
(4)

wherein each of $R^1$ to $R^4$ is independently selected from the group consisting of H, halogens, and alkyl groups having a carbon number of less than or equal to 8, and where adjacent $R^1$ to $R^4$ groups may optionally be combined with each other to form cycles or hetero cycles, and each of $R^5$ to $R^8$ is independently selected from the group consisting of H, halogens, alkoxy groups having a carbon number of less than or equal to 8, and unsaturated or saturated alkyl groups having a carbon number of less than or equal to 8, and where adjacent $R^5$ $R^8$ groups may optionally be combined with each other to form cycles or hetero cycles.

7. The electrolyte of claim 1, wherein the additive is represented by the following Formula 5:

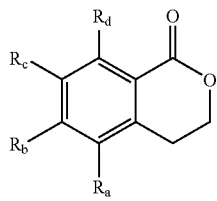
(5)

wherein each of $R_a$ to $R_d$ is independently selected from the group consisting of H, halogens, alkyl groups having a carbon number of less than or equal to 8, and where adjacent $R_a$ to $R_d$ groups may optionally be combined with each other to form cycles or hetero cycles.

8. The electrolyte of claim 1, wherein the additive is represented by the following Formula 6:

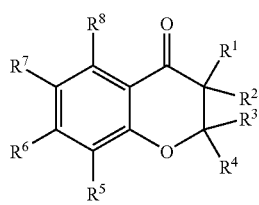
(6)

wherein each of $R^1$ to $R^4$ is independently selected from the group consisting of H, halogens, and alkyl groups having a carbon number of less than or equal to 8, and where adjacent $R^1$ to $R^4$ groups may optionally be combined to each other to form cycles or hetero cycles, and each of $R^5$ to $R^8$ is independently selected from the group consisting of H, halogens, alkoxy groups having a carbon number of less than or equal to 8, and unsaturated or saturated alkyl groups having a carbon number of less than or equal to 8, and where adjacent $R^5$ to $R^8$ groups may optionally be combined with each other to form cycles or hetero cycles.

9. The electrolyte of claim 1, wherein the additive is represented by the following Formula 7:

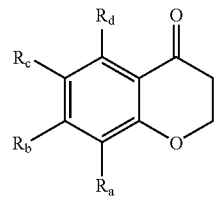
(7)

wherein each of $R_a$ to $R_d$ is independently selected from the group consisting of H, halogens, alkoxy groups having a carbon number of less than or equal to 8, and unsaturated or saturated alkyl groups having a carbon number of less than or equal to 8, and at least one of $R_a$ to $R_d$ is selected from the group consisting of fluorine, alkoxy groups having a carbon number of less than or equal to 8, and unsaturated or saturated alkyl groups having a carbon number of less than or equal to 8.

10. The electrolyte of claim 1, wherein the additive is a compound selected from the group represented by the following Formulas 8 to 19:

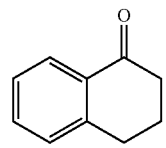
(8)

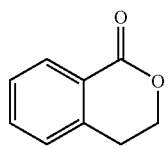
(9)

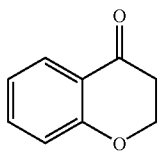
(10)

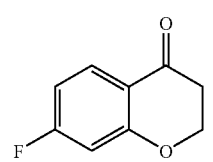
(11)

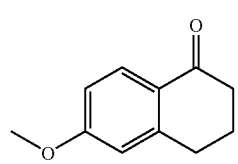
(12)

-continued

(13) 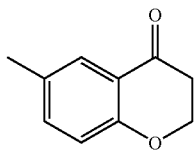

(14) 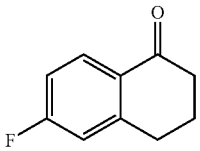

(15) 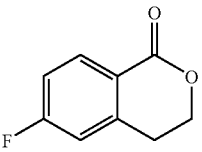

(16) 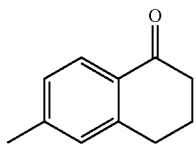

(17) 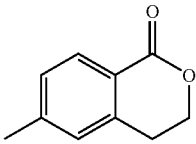

(18) 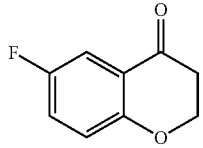

(19) 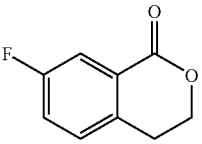

11. The electrolyte of claim 1, wherein an amount of the additive is 0.01 wt % to 50 wt % based on the total weight of electrolyte.

12. The electrolyte of claim 1, wherein the lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI and combinations thereof.

13. The electrolyte of claim 11, wherein a concentration of the lithium salt is from 0.6M to 2.0M.

14. The electrolyte of claim 1, wherein the non-aqueous organic solvent is selected from the group consisting of carbonates, esters, ethers, ketones, and combinations thereof.

15. The electrolyte of claim 14, wherein the carbonates are selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and combinations thereof.

16. The electrolyte of claim 14, wherein the non-aqueous organic solvent is a mixture of a cyclic carbonate and a linear carbonate.

17. The electrolyte of claim 1, wherein the non-aqueous organic solvent is a mixture of a carbonate solvent and an aromatic hydrocarbon solvent.

18. The electrolyte of claim 17, wherein the aromatic hydrocarbon solvent is represented by the following Formula 30:

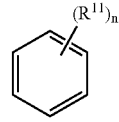

(30)

wherein $R^{11}$ is selected from the group consisting of halogens and $C_1$ to $C_{10}$ alkyls, and n is an integer from 0 to 6.

19. The electrolyte of claim 17, wherein the aromatic hydrocarbon solvent is selected from the group consisting of benzene, fluorobenzene, toluene, trifluorotoluene, chlorobenzene, xylene, and combinations thereof.

20. The electrolyte of claim 17, wherein the carbonate solvent and the aromatic hydrocarbon solvent are mixed in a volume ratio of 1:1 to 30:1.

21. A lithium battery comprising:
an electrolyte according to claim 1;
a positive electrode including a positive active material capable of intercalating and deintercalating lithium ions; and
a negative electrode including an active material selected from the group consisting of a material capable of intercalating/deintercalating lithium ions, a lithium metal, a lithium-containing alloy, and a material capable of forming a lithium-containing compound by reversibly reacting with lithium.

* * * * *